United States Patent Office 2,875,030
Patented Feb. 24, 1959

2,875,030
DEFOLIATING WITH COMPOUNDS CONTAINING THE NSCCl₃ GROUP

William H. Brugmann, Jr., Milltown, Howard L. Yowell, Westfield, and Allen R. Kittleson, Cranford, N. J., assignors to Esso Research and Engineering Company, a corporation of Delaware No Drawing. Application September 8, 1955
Serial No. 533,246

5 Claims. (Cl. 71—2.5)

This invention relates to improved compositions and methods for defoliating plants. More particularly it relates to improved aqueous emulsions for carrying out these purposes.

The importance and desirability of defoliating living plants is well known. Of particular widespread economic importance is the defoliation of cotton, especially since the successful development of the mechanical cotton picker. This latter development has promoted much research and development in the field of artificial defoliation. Use of defoliants thus increases the efficiency of mechanical cotton pickers. They permit farmers to harvest crops without waiting for frost to naturally defoliate the plant.

It has now been found that particular multicomponent aqueous emulsions having as the active ingredients organic compounds containing the $$\diagdown_{\diagup} NSCCl_3$$

group linked to two carbon atoms of the residual organic compound are especially effective defoliants. These emulsions comprise in addition to the active ingrenients and water, a mineral spray oil and an oil soluble emulsifying agent. All these four components in combination are necessary to secure the desired defoliating effect without deleteriously affecting the remainder of the plant, e. g., the active ingredient without the oil in the formulation has no utility for this purpose. The concentrations, as explained in further detail below, are also extremely important in this connection as lesser quantities of the compounds having the $$\diagdown_{\diagup} NSCCl_3$$

group do not produce the desired results.

The compounds containing the $$\diagdown_{\diagup} NSCCl_3$$

group and their preparation are disclosed at length in U. S. Patents 2,553,770, 2,553,771, 2,553,774, and 2,553,775. Their use as non-phytotoxic parasiticides is also disclosed in those patents. The present invention is based on the discovery that in rather high concentrations in the indicated oil emulsion systems they also have defoliating characteristics.

The physiologically active compounds of this invention may thus best be represented as having the $$\diagdown_{\diagup} NSCCl_3$$

group in which the nitrogen is linked to two carbon atoms, two acyl groups, or one acyl group and one carbon atom. The phrase acyl group refers to groups of the following character:

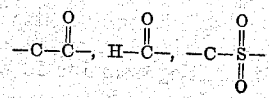

etc. (see Hackh, "Chemical Dictionary," second edition, page 21). When the nitrogen atom of the $$\diagdown_{\diagup} NSCCl_3$$

is linked to one acyl group, the compounds may be regarded as amide derivatives, i. e., N-thiotrichloromethyl amides (or N-trichloromethylthio amides). When both of the free linkages of the $$\diagdown_{\diagup} NSCCl_3$$

group are taken up by acyl groups, the compounds may be regarded as N-thiotrichloromethyl imides (or N-trichloromethylthio imides). (See Sidgwick's "Organic Chemistry of Nitrogen," 1937 edition, pages 136 and 152.)

The N-thiotrichloromethyl imides (or N-trichloromethylthio imides) which have the following general formula

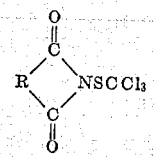

where R is an organic residue, are especially effective. The organic residue may be aliphatic, aromatic, alicyclic, heterocyclic, and their substituted derivatives. Typical of the compounds that can be utilized are N-trichloromethylthio tetrahydrophthalimide, N-trichloromethylthio phthalimide, N-trichloromethylthio endomethylene tetrahydrophthalimide, N-trichloromethylthio succinimide, chlorinated N-trichloromethylthio tetrahydrophthalimide, N-trichloromethylthio 4-nitrophthalimide, N-trichloromethylthio 5,5-dimethyl oxazolidine 2,4-dione, N-trichloromethylthio 5-methyl 5-ethyl oxazolidine, 2,4-dione, N-trichloromethylthio 5,5-pentamethylene oxazolidine 2,4-dione, N-trichloromethylthio 5-phenyl 5-methyl oxazolidine, 2,4-dione, N-trichloromethylthio morpholine, N-trichloromethylthio 5-isobutyl 5-methyl oxazolidine 2,4-dione, N-trichloromethylthio 5-cyclopropyl 5-methyl oxazolidine 2,4-dione, N-trichloromethylthio 2,4-dioxothiazolidine, N-trichloromethylthio o-benzoic sulfimide, 3-trichloromethylthio 5,5-dimethyl hydantoin, 1-nitro 3-trichloromethylthio 5,5-dimethyl hydantoin, 1-acetyl 3-trichloromethylthio 5,5-dimethyl hydantoin, and N-trichloromethylthio C₉ alkanyl succinimide. Particularly effective compounds are N-trichloromethylthio 3-methyl tetrahydrophthalimide, N-trichloromethylthio hexahydrophthalimide, N-trichloromethylthio 5,5-dimethyl oxazolidine 2,4-dione, and N-trichloromethylthio morpholine.

The mineral oil carries which may be utilized are, for example, any of the normally used horticultural spray oils. For practical reasons these oils will usually be mineral oils, but oils of animal or vegetable origin or synthetic oils are also satisfactory. In general, the oils should be of a relatively bland, non-toxic nature since any composition which would kill the plant outright could not promote the development of the abscission layers which is necessary to successful defoliation. In order to avoid objectionable staining of the cotton fibers, oils with only a fairly light color should be used.

These oils typically have a boiling point in the range of 250° to 550° F., a viscosity in the range of 30 to 150 SSU/100° F. and the petroleum oils are predominantly at least 50 wt. percent to 75 wt. percent saturated hydrocarbons, paraffinic or naphthenic. The synthetic oxygenated fraction known as Oxo bottoms can also be utilized, and are intended to be connoted by the term "mineral spray oil." The preparation and the character of these Oxo bottoms are described in detail in U. S. Patent 2,586,681. Blends of the mineral spray oils can also be utilized.

The emulsifying agents that can be utilized are oil soluble emulsifying agents known to the art. These include by way of example by trade name and chemical description as follows: Igepal CD-630, alkyl aryl polyoxyethylene glycol ether; Acto, petroleum sulfonates; Nonisol 210, polyethylene glycol oleate; Mulsor 3CW, long chain fatty acid ester containing multiple ether linkages; Triton X45, alkylated aryl polyether alcohol; and a petroleum sulfonate modified with a minor amount of a nonionic emulsifier. Blends can be utilized.

The compositions of this invention are thus conveniently made up in the forms of emulsion concentrates containing 5 to 50 wt. percent of the active ingredient, 40 to 90 wt. percent of the mineral spray oil, and 1 to 10 wt. percent of the emulsifier. These concentrates can then be diluted in the field with water so that the emulsion concentrate constitutes from 10 to 50 wt. percent of the total aqueous emulsion formulation. The active ingredient is contained as a fine colloidal dispersion in the resulting emulsion. As stated previously the concentrations as well as the compounds are important to secure the desired activity.

The aqueous emulsion is applied to the plants at a rate of 5 to 40 gallons per acre, preferably 5 to 20 gallons per acre. The lower figures are used for airplane spraying and the upper figures for ground spray equipment. The time of application varies with the plant, e. g. it is most effectively applied to cotton plants when the latter have matured as when 40% of the cotton balls have opened. Ten days to two weeks is all that is normally required to secure the maximum defoliation. No adverse effect is noted on the drops where the composition of this invention is applied to cotton. It can also be applied to edible, dry beans, soy beans and flax.

The following examples illustrate this invention and indicate test results obtained with the compositions of this invention emulsified with water.

Example 1

The various active ingredients were applied in the form of aqueous emulsions to cotton plants at the Delta Branch Experiment Station, Stoneville, Mississippi. Each formulation was applied to four hills, each hill containing from 1 to 3 plants. WS-1449 is a 50/50 blend of Bayol D, a petroleum white oil with Mentor 28, a conventional refined paraffin oil having an unsulfonatable residue of 85-90%. The blend viscosity is 45 SSU/100° F. The application rate was 40 gallons of emulsion per acre. The results were tabulated 10 days to 2 weeks after application. The results were as follows:

| Emulsifiable Concentrate, Wt. Percent | | | Concn. of Emuls., Conc. in Water (Wt. Percent) | Applic. Rate of Emuls., Gal./Acre | Defoliation, Percent |
| --- | --- | --- | --- | --- | --- |
| Active Ingredients | Mineral Oil Carrier | Emulsifier | | | |
| N-trichloromethylthio 3-methyl tetrahydrophthalimide, 8%. | WS-1449, 87% | Mulsor 3CW, 3% +Acto 630,[1] 2%. | 25 | 40 | 80 |
| N-trichloromethylthio 5,5-dimethyl oxazolidine 2,4-dione, 8%. | WS-1449, 87% | Mulsor 3CW, 3% +Acto 630, 2%. | 25 | 40 | 80 |
| N-trichloromethylthio morpholine, 8% | WS-1449, 87% | Mulsor 3CW, 3% +Acto 630, 2%. | 25 | 40 | 85 |
| N-trichloromethylthio hexahydrophthalimide, 8%. | WS-1449, 87% | Mulsor 3CW, 3% +Acto 630, 2%. | 25 | 40 | 85 |
| [structure: CH₃, CH₂ phthalimide with NSCCl₃] 4%. | WS-1449, 91% | Mulsor 3CW, 3% +Acto 630, 2%. | 25 | 20 | 65-70 |
| [structure: CH₃, CH₂ phthalimide with NSCCl₃] 4%. | Varsol #1, 92% | Tween 21, 3% | 25 | 20 | 60-65 |
| [structure: CH₃-C, CH₂, CH, CH₃ oxazolidine dione with NSCCl₃] 4%. | Varsol #1, 91% | Mulsor 3CW, 3% +Acto 630, 2%. | 25 | 20 | 65 |
| None | WS-1449, 87% | Mulsor 3CW, 3% +Acto 630, 2%. | 25 | 40 | 20 |

[1] Acto 630+63% petroleum sulfonate in mineral oil.

The defoliation figure represents the leaf drop/total original leaves times 100. 65 to 70% defoliation is the minimum required for an effective defoliant. The figures presented above demonstrate that at least about 65% and usually greater defoliation was obtained with the emulsified compositions of this invention containing as little as 1 wt. percent of the active defoliant, as contrasted to 20% for the control.

The utilization of the compositions of this invention represents extremely large labor savings and lower growing costs.

It is to be understood that this invention is not limited to the specific examples which have been offered merely as illustrations, and that modifications may be made without departing from the spirit of this invention.

What is claimed is:

1. A method of defoliating a cotton plant which comprises applying to said plant an aqueous emulsion of a concentrate comprising from 5 to 50 weight percent of a N-trichloromethylthio imide of a carboxylic acid having the following general formula

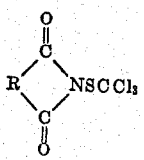

wherein R is an organic residue, from 40 to 90 wt. percent of a non-toxic mineral spray oil, and from 1 to 10 weight percent of an oil soluble emulsifying agent, the aforesaid concentrate constituting from 10 to 50 wt. percent of the total aqueous emulsion and providing at least 1 wt. percent of said imide in said emulsion.

2. The method of claim 1 in which the emulsion is applied at the rate of 5 to 40 gallons per acre.

3. The method of claim 1 in which the organic chemical compound is N-trichloromethylthio 3-methyl tetrahydrophthalimide.

4. The method of claim 1 in which the organic chemical compound is N-trichloromethylthio hexahydrophthalimide.

5. The method of claim 1 in which the organic chemical compound is N-trichloromethylthio 5,5-dimethyl oxazolidine 2,4-dione.

References Cited in the file of this patent
UNITED STATES PATENTS

| | | |
|---|---|---|
| 2,553,770 | Kittleson | May 22, 1951 |
| 2,553,771 | Kittleson et al. | May 22, 1951 |
| 2,553,776 | Kittleson | May 22, 1951 |
| 2,558,762 | Kohr et al. | July 3, 1951 |
| 2,696,453 | Sanders et al. | Dec. 7, 1954 |
| 2,713,058 | Kittleson | July 12, 1955 |
| 2,746,854 | Yowell et al. | May 22, 1956 |